United States Patent [19]
Kessick

[11] 3,803,059

[45] Apr. 9, 1974

[54] SNAKE-CAGE RESINS
[75] Inventor: Michael A. Kessick, Altadena, Calif.
[73] Assignee: California Institute of Technology, Pasadena, Calif.
[22] Filed: July 26, 1972
[21] Appl. No.: 275,319

[52] U.S. Cl............................ 260/2.1 E, 260/2.1 C
[51] Int. Cl........................ C08f 41/10, C08g 37/20
[58] Field of Search...................... 260/2.1 R, 2.1 C Primary Examiner—Melvin Goldstein
Attorney, Agent, or Firm—Marvin E. Jacobs

[57] ABSTRACT

Snake-cage resins are described where a phenol is absorbed as a counterion along the cationic sites of a crosslinked three-dimensional matrix of a strong base anion-exchange resin initially in the hydroxide form. The absorbed phenol is then polymerized linearly by refluxing in 1:1 mole ratio with formaldehyde in aqueous solution, thus producing a "snake-cage" configuration. Redox polyelectrolytes are derived from polyphenols, and resins capable of binding the monoborate ion from polyphenols or o-hydroxymethyl substituted phenols. The redox capacities of the polyphenolic resins were found to approach theoretical at between 5.1 and 5.4 meq/g. The hydroxymethyl substituted resins are certain of the polyphenolic resins show a marked specificity for absorption of borate ions.

18 Claims, 5 Drawing Figures

SNAKE-CAGE RESINS

ORIGIN OF THE INVENTION

The invention described herein was made in the course of work under a grant or award from the Department of Health, Education and Welfare.

BACKGROUND OF THE INVENTION

1. Field of the Invention

The present invention relates to snake-cage resins and more particularly to linear phenol-formaldehyde condensation polymers occluded within a crosslinked, strong-base, anion-exchange matrix and to the use of such products for removing selected molecular species from aqueous solution, or for changing the oxidation state of selected molecular species in aqueous solution.

2. Description of the Prior Art

Many methods for the preparation of crosslinked polymers with oxidation-reduction capacity in aqueous solution have been reported. The resins appear to fall into three main categories; those produced by the addition polymerization of redox-active monomers, such as vinylhydroquinone, those produced by the condensation polymerization of redox active polyphenols, such as hydroquinone, with formaldehyde; and those obtained by the attachment, reversible or irreversible, of redox active materials to preformed polymer matrices.

The synthesis of the addition-type redox polymers has been attended by many difficulties, not least of which is that the monomers themselves often act as inhibitors during the polymerization process. The resulting resins tend to be quite hydrophobic and are unsatisfactory for use in aqueous systems unless strongly hydrophilic groups are introduced, for example, by sulfonation. The condensation polymers are more readily formed, but tend also to be intractable and of low porosity unless chemically treated after polymerization, as by sulfonation, or unless comonomers such as sodium o-benzaldehyde sulfonate are included during the polymerization process. Both addition and condensation redox polymers are subject to skeletal degradation by certain oxidants and by strong base solution. This seems generally true of polymers where the redox functionality can be considered part of the polymer backbone.

The attachment of redox active materials to preformed polymer matrices has probably resulted in the most successful resins to date. A commercial resin of this type used for removing dissolved oxygen from solution, depends for its effectiveness on the interconversion between complexed divalent copper and sorbed zero-valent (metallic) copper in a anion-exchange matrix. It is unstable below pH 7. In another approach systems were prepared in cation exchange resin matrices involving absorbed metallic ions capable of redox behavior, such as $Fe^{2+}/Fe^{3+}$, $Sn^{2+}/Sn^{4+}$, as well as in anion exchange resin matrices by the simple absorption of hydroquinone type compounds on the hydroxyl forms of Amberlite IRA-400 and Wofatit M. These products in common with the sorbed complex copper product do not show stability throughout the entire pH range. Redox systems have also been obtained by Friedel-Crafts addition of hydroquinone-type compounds to preformed, chloromethylated, macroreticular styrene-divinylbenzene copolymers. These compounds are hydrophobic and swell little in aqueous solution unless further treated, for instance, by chlorsulfonic acid, or unless some of the chloromethyl groups are reserved for quaternization with tertiary amines.

Conventional polystyrene based anion-exchange resins exhibit low selectivity for the borate ions $B(OH)_4^-$ which certainly lies below $Cl^-$ in the selectivity sequence of ions for these resins. A borate-specific resin containing aliphatic polyhydroxy functionality (Amberlite XE-243) is currently available commercially. Although conventional strong base anion exchange resins in the hydroxyl form are used to remove boric acid from the primary cooling water of nuclear powered generators down to less than 0.02 mg B/l, boron cannot be removed to less than about 20 mg B/l (where $B(OH)_4^-$ is considered to be the predominant anion) by such resins in the chloride form. Due to the well known toxicity of this element toward terrestial plants, there is considerable interest in the selective removal of borates in small concentrations from natural and waste waters.

OBJECTS AND SUMMARY OF THE INVENTION

It is therefore an object of this invention to provide new and improved snake-cage resins capable of absorbing selective molecular species from aqueous solution.

A further object of the invention is the provision of improved redox resins which are simply and efficiently synthesized in high yield to produce stable, hydrophilic resins having high redox capacity.

A further object of the invention is the provision of snake-cage redox polyelectrolytes which are highly porous, are effective over a wide pH range and are not readily subject to degradation.

A still further object of the invention is the provision of resins capable of boron complexation.

A still further object of the invention is the provision of tractable, hydrophilic matrix resins, permeable to water and having the ability to remove low concentrations of boron from aqueous solutions.

These and other objects and many intended advantages of the invention will become apparent as the description proceeds.

These objectives are accomplished in accordance with the invention by the production of snake-cage resins capable of acting as redox polyelectrolytes or as boron complexing polymers. The resins are produced by linearly polymerizing a phenol-formaldehyde condensation resin within the matrix of a strong base anion-exchange resin in the hydroxyl form. The absorbed monomer is polymerized in situ by contacting the absorbed material with aqueous formaldehyde in equimolar proportion to the absorbed phenol and heating the material to polymerization temperature. The linear chains of polymerized phenol thus formed are trapped in the anion-exchange resin matrix and the probability of desorption of the desired functionality is thus extremely low, except under conditions which would promote catastrophic degradation of the included polymer chains or the anion-exchange resin matrix itself.

The invention will now become better understood by reference to the following detailed description when considered in conjunction with the accompanying drawings.

DESCRIPTION OF THE PREFERRED EMBODIMENTS

Figure 1:
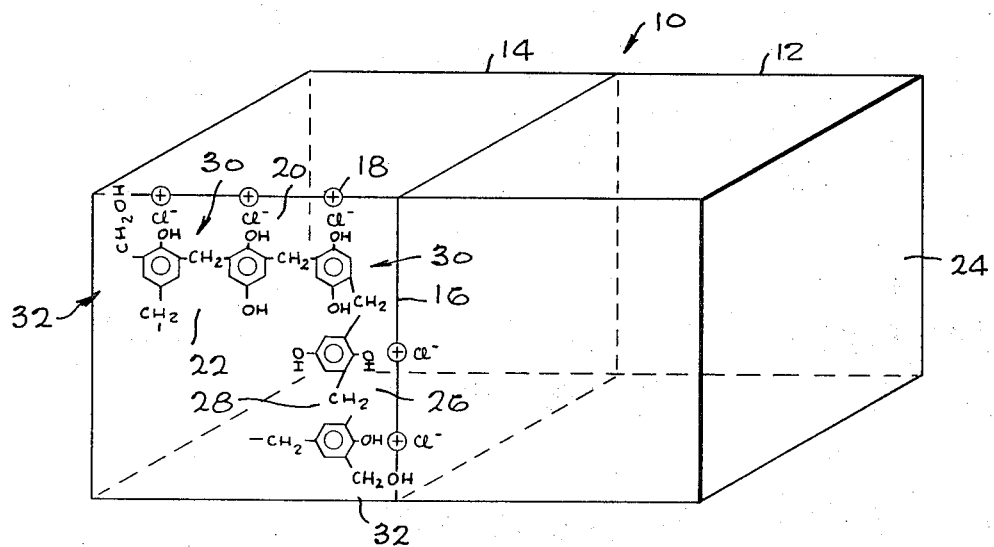
FIG. 1 is a schematic perspective view of the snake-cage resin in accordance with the invention shown in low pH form.

Referring now to FIG. 1, a schematic view of a portion 10 of a low pH form of the snake-cage resin is illustrated. The resin comprises a matrix 12 formed of the backbone polymer chain 14 and crosslinking groups 16 which form a three-dimensional porous network. Cationic groups 18 integral or pendant from the chain 14 or from the crosslinks 16 are associated with anions 20 such as chloride. A linear phenol-aldehyde polymer 22 is occluded within the matrix 12 and winds along and past the chain and crosslinks throughout different adjacent cells or cages 24 of the matrix 12. At high pH the phenol groups 26 on the linear phenol-aldehyde polymer 22 themselves become ionized and displace other anions 20 such as chloride from association with the fixed cationic groups 18.

Figure 2:
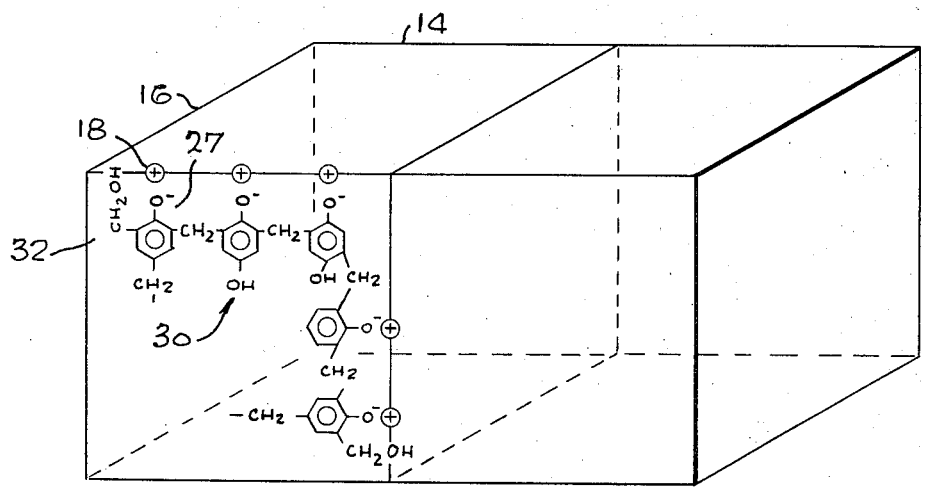
FIG. 2 is a schematic perspective view of the resin shown in high pH form directly after synthesis.

As shown in FIG. 2, at high pH each ionized phenol group 27 is stoichiometrically associated as a phenolate anion with a fixed cationic group 18. The phenol groups are linearly attached by methylene groups 28 introduced by formaldehyde copolymerization. The phenol groups contain hydroxyl 30 or hydroxymethyl 32 groups capable of redox or boron complexing action.

The matrix resin is a three-dimensional cage network typical of a cross-linked, strong base anion exchange resin. The matrix resin may be formed from amine-substituted acrylic resins, amine-substituted phenolic resins, amine-aldehyde resins, or amine-substituted polystyrene resins. The most stable resins are formed from quaternary ammonium-substituted styrene-divinyl benzene copolymers containing a small amount, typically below about 5 percent by weight of divinylbenzene and having an ion exchange capacity between about 3–6 meq/dry gram.

For example, Dowex 11, a strong-base anion exchange resin having a capacity of 4.1 ± 0.3 meq/dry gram, is a styrene-divinylbenzene, cross-linked copolymer. The amine groups are provided by trimethyl amino-methyl groups introduced onto the styrene and/or divinylbenzene rings by chlomethylation and reaction with a tertiary amine according to the Menschutkin reaction. The resin may be provided in diverse physical forms such as sheet, film, particles, rods, and the like. A typical commercial form of the resin is in bead form of 20–50 mesh.

The phenol can be a monohydroxy or polyhydroxy aromatic compound and can be monocyclic or polycyclic in structure. In the case of monohydroxy phenols or 1,3 polyphenols, a further hydroxy group in the form of a hydroxy lower alkyl is introduced onto the ring in ortho position after polymerization to provide the desired functionality. Representative phenols are: hydroquinone, pyrogallol, catechol, resorcinol, phloroglucinol, phenol itself. The phenols can be characterized by the general formula:

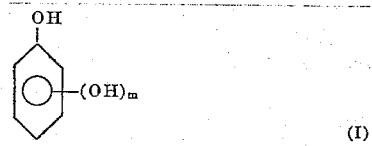

where $m$ is an integer from 0 – 2.

The matrix resin is typically in the chloride form and is converted to the hydroxyl form by repeated washing with a dilute, below 5 percent by weight, alkali metal hydroxide such as 2 percent sodium hydroxide. Excess caustic is removed with an aqueous wash.

The resin is then suspended in water and the phenol is added in an amount equivalent to the ion exchange capacity of the resin. The phenol molecules are absorbed stoichiometrically along the ionic sites of the matrix resin as illustrated in the following formula:

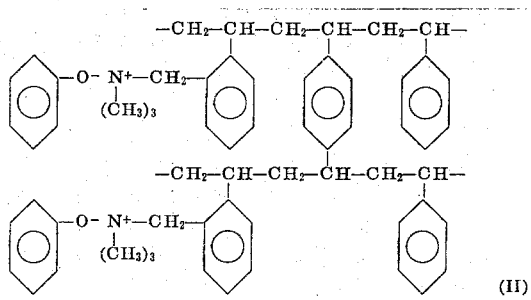

Formaldehyde is then added, typically as commercial formalin (a 37 percent aqueous formaldehyde solution) in an equivalent molar quantity. Linear polymerization proceeds to form methylene groups linking the stationary, absorbed phenol groups as illustrated in the following formula:

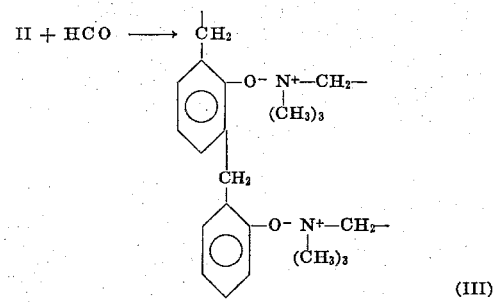

The rate of polymerization is increased by heating the mixture to an elevated temperature of 50° – 150°C for 2 – 5 hours, typically at reflux (100°C) for 4 hours. The mixture is then cooled and the beads washed.

For use as redox agents the polyphenols must contain 1,2- or 1,4- dihydroxy functionality to enable formation of quinoidal structure on oxidation according to the following reactions:

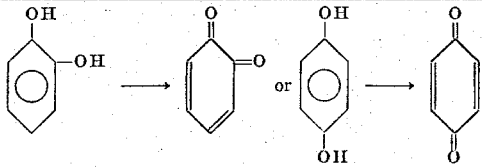

In the case of phenols such as phenol or resorcinol, ortho-hydroxymethyl functionality can be introduced onto the benzene rings of the occluded linear polymer by placing the snake-cage resin beads in excess, aqueous formaldehyde, typically 1 to 5 molar solution for a period of 10 to 200 hours at low temperature, usually below 50°C. This procedure introduces hydroxy methyl groups onto positions ortho to the phenolic group, thus providing saligenin functionality capable of binding borate ions as illustrated in the following equilibrium reaction:

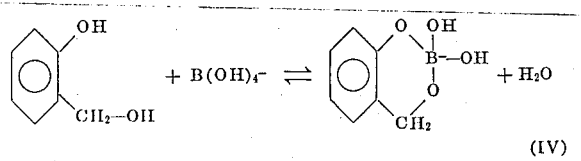

(IV)

Specific examples of practice follow:

Example 1

A 50-g portion of Dowex 11 was placed in the hydroxyl form by repeated washing with 2 percent sodium hydroxide solution. After washing away of excess base with water, the resin beads were stirred in 200 ml of water with an amount of hydroquinone equivalent to 4.1 mmole per dry gram of resin for 15 min. Formaldehyde in aqueous solution was then added in equivalent molar quantity and the mixture refluxed for 4 hours. The mixture was cooled, and the beads were then washed several times with 1.0N hydrochloric acid by decantation, filtered at the pump, and stored in a moist state. The snake-cage resin beads containing an occluded polymerized hydroquinone were a deep, reddish-brown. The beads were black in the oxidized form. Standing in 1.0N sodium hydroxide solution for two days caused moderate discoloration of the solution in the case of the resin based on hydroquinone.

Example 2

Example 1 was repeated under the same conditions utilizing catechol as a phenol. The snake-cage resin beads containing the occluded linear catechol-formaldehyde polymer were light brown in color in the reduced chloride form. The beads were black in the oxidized form. Standing in 1.0N sodium hydroxide solution for two days caused slight discoloration of the solution.

Example 3

Example 1 was repeated utilizing pyrogallol as the phenol. The snake-cage resin beads containing the occluded linear pyrogallol-formaldehyde polymer were light brown in color in the reduced chloride form, were black in the oxidized form and on standing in 1.0N sodium hydroxide solution for two days caused moderate discoloration of the solution.

The redox capacities of the snake-cage resin beads of Examples 1–3 were determined by placing a 1-g dry weight sample of each resin in the reduced state by stirring for 1 hour with 200 ml of a solution containing sodium hydrosulfite (0.1M) and sodium hydroxide (0.2M). After washing rapidly with distilled water and 1N hydrochloric acid, the resin sample was drained and added to 1 liter of a solution containing potassium iodide (1N) and iodine (0.02N). This solution had previously been deaerated by flushing with prepurified nitrogen, and the reaction was stirred under nitrogen for the duration of the experiment. Since the pH of the solution remained at 2.5 throughout the determination, this minimized the production of free iodine by air oxidation of iodide.

At regular time intervals, aliquots of the iodine/iodide solution were withdrawn and estimated by titration with 0.2N sodium thiosulfate solution until no change in iodine concentration was noticed. The decrease in iodine concentration corresponded to the oxidation of the resin, coupled with some absorption of iodine by the resin either as $I_3^-$ counterions or as $I_2$ molecules. The amount of iodine absorbed in this manner was determined at the end of each oxidation by washing the resins beads several times with distilled water, draining them, and stirring them with a deaerated solution 1N in potassium iodide alone. After 1 hour, this solution phase was then estimated for iodine, and the amount determined taken to be that which had been absorbed by the resin, but which had not taken part in the oxidation. From the results obtained, the oxidation-reduction capacity of the resin was calculated.

Figure 3:
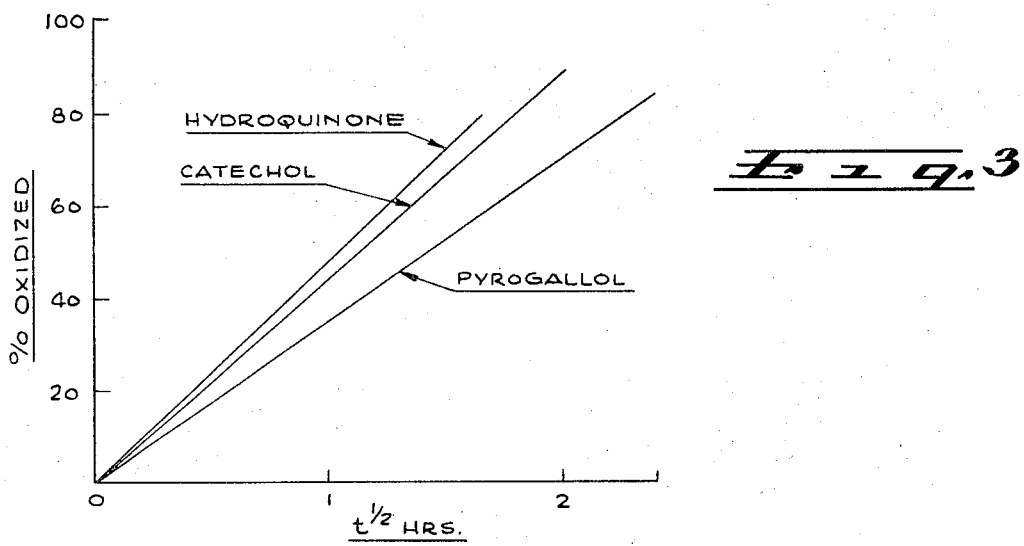
FIG. 3 is a graph showing the percent oxidized of snake cage resins by $I_3^-$.

FIG. 3 shows the oxidation of the three resins prepared as a function of $t^{1/2}$. The values have been corrected for the amount of iodine found to be physically absorbed at the end of each determination. All determinations were carried out at room temperature.

Values for redox capacities of 5.3, 5.2, and 5.1 meq/dry gram where determined experimentally for the polymers prepared with pyrogallol, catechol, and hydroquinone respectively, compared with calculated values of 5.20, 5.47, and 5.47 meq/g based on 100 percent yield. Similarly, values of 1.04, 0.72, and 0.60 meq/g were determined as the absorptive capacities of the resins for iodine.

The light coloration of the catechol and pyrogallol resins in their reduced forms, coupled with their stability and near theoretical capacity, indicates that even though polymerization of these polyphenol molecules had been carried out in their ionized forms at high temperature and in the presence of oxygen, linkage through quinone methide or semiquinone intermediates was at a minimum. Such linkage is believed to produce the strong coloration, often black, associated with phenoplasts, and it is believed that the lack of such structure here is due to the position of the polyphenol molecules in the anion exchange resin matrix during polymerization, with the phenolate ions and adjacent phenol groups being stabilized by orientation towards the fixed positive charges on the anion exchange resin matrix.

The resin prepared with hydroquinone showed deeper color in the reduced form and also a greater tendency towards degradation by strong base. This is consistent with the fact that both phenolic groups on the hydroquinone molecule cannot be oriented towards fixed positive charges at the same time, one thus being more susceptible to chemical attack, both during the polymerization and during any subsequent reaction. The greater tendency of the pyrogallol resin to decompose in base, again compared to the catechol resin, may be attributed to increased functionality and thus also less adequate stabilization.

The oxidation of the pyrogallol snake-cage resin by $I_3^-$ as a function of time shows a form characteristic of a process controlled by diffusion within the resin beads.

This is further confirmed in FIG. 3 by the straight line dependence on $t^{1/2}$ during the initial stages of oxidation for all three resins.

The snake-cage redox polyelectrolytes of the invention and especially those prepared with catechol and pyrogallol suffer few of the drawbacks associated with previously reported redox polymers. They show a marked selectivity against cationic species. It is believed that these resins will find substantial use as immobile antioxidants and particularly will find use to remove dissolved oxygen from boiler-grade water or feed process water to industrial processes.

The snake-cage redox polyelectrolytes prepared with catechol and pyrogallol also show capacity for the selective absorption of boron from dilute aqueous solution under reducing conditions. The ability of borate to form complexes with compounds such as catechol, pyrogallol and saligenin is a well known phenomenon, and may be described by the equilibrium reaction illustrated in reaction equations IV and V

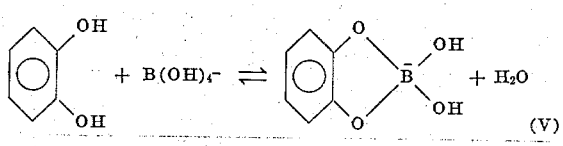

The polymers of Examples 2 and 3 provide ortho disposition of the two hydroxyl groups and since the hydroxy phenols have been polymerized into tractable, hydrophilic matrices, the resin beads are still permeable to water. They have the ability to remove low concentrations of boron from aqueous solutions by the complexing method illustrated above.

The complexing action is also exhibited by materials containing saligenin functionality.

Example 4

The procedure of Example 1 was repeated using phenol as the hydroxy aromatic. After absorption of the phenol as anion onto Dowex 11 and linear polymerization in the usual manner, the resin beads were allowed to stand in excess formaldehyde solution (5M) for approximately one week at room temperature during which time the remaining free positions on the aromatic ring ortho to the phenolic group become hydroxymethylated, thus introducing the saligenin functionality. The resins beads were then washed and stored in the acid form for use in absorption experiments.

Example 5

The procedure of Example 4 was repeated utilizing resorcinol as the hydroxy aromatic to form a snake-cage resin having saligenin, or o-hydroxymethyl functionality.

The borate binding efficiency of these resins was tested according to following procedure:

Example 6

Batch experiments were performed where the borate absorptive capacities of Dowex 11 alone and the snake-cage resins based on pyrogallol, catechol, hydroxymethylated phenol and hydroxymethylated resorcinol were studied as a function of pH. The results were compared with similar data obtained for the commercially available boron-specific resin containing aliphatic hydroxy functionality associated with N-methyl glucamine incorporated in a cross-linked polystyrene structure.

200 ml volumes of buffer solutions containing 10 mg (50 mg/l) of boron as B were shaken in polyethylene bottles for 20 hours with 0.5 g (dry weight) samples of the resins, and the amount of boron absorbed (mg/g) plotted against pH.

Figure 4:
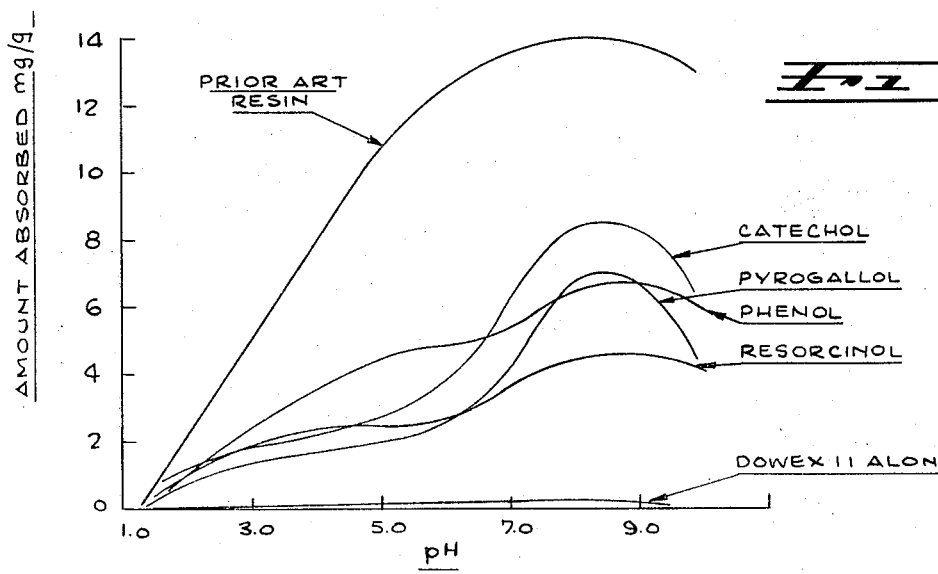
FIG. 4 is a graph showing the boron absorption as a function of pH by resins prepared in accordance with the invention.

Results are depicted in FIG. 4 and reported in terms of the chloride forms for the phenolic resins and Dowex 11. The buffer systems used were 0.2 N HCl, acetate/acetic acid and $CO_2$/bicarbonate/carbonate. Boron was determined by the mannitol method. In the case of the catechol and pyrogallol resins care was taken to deaerate the solutions by flushing with either $CO_2$ or $N_2$ before the experiment was started.

Column experiments were also performed with the resins based on catechol and phenol. The solution passed through the columns contained 300 mg/l $HCO_3^-$, 100 mg/l $SO_4^{2-}$, and 10 mg/l B, and its pH while in the reservoir was controlled at 7.6 by continuous flushing with a pre-saturated 1% $CO_2$, 99% $N_2$ gas mixture. This avoided specific deaeration of the solution to be used in the case of the catechol resin. Breakthrough capacities for absorption of boron by the two resins were determined. Regeneration of the resins was effected by elution of the boric acid with 1 N $H_2SO_4$, followed by treatment with 0.2 N NaOH in the case of the phenol based resin, and treatment with 0.2 N NaOH containing 0.1 N sodium hydrosulfite for the catechol based resin.

Figure 5:
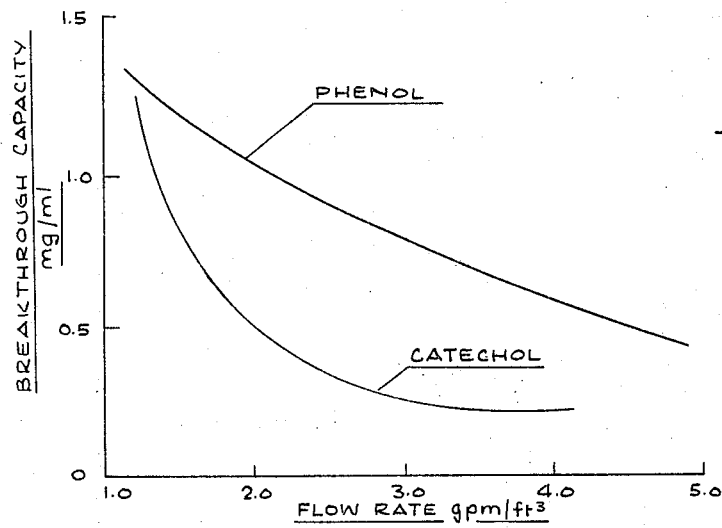
FIG. 5 is a graph illustrating the dependence of boron breakthrough capacity (mg B/ml) on flow rate, during column operation.

FIG. 5 indicates that the four resins studied show a marked specificity for absorption of borate in comparison with Dowex 11 alone, although their capacities were not as good as that of the commercial boron-specific resin, probably as a result of the greater number of hydroxy groups per unit weight of the latter. Use of the resins based on catechol would be restricted by their redox characteristics, in particular reaction with dissolved oxygen, which may affect or destroy their complexing ability. The low ion-exchange rates for phenol or catechol based resins demonstrated by the column experiments are probably due to reduced mobility of a preferred counterion which is held by way of complex formation rather than electrostatic attraction.

The resins of the invention can be utilized over a wide pH range. Prior art materials were based on separate molecules of hydroquinone which were absorbed by a substrate polyelectrolyte resin. However, at low pH, the hydroquinone is in a non-ionized form which could be eluted. However, in the resin of the invention the phenol is polymerized and the snake resin occluded by the cage is immobilized and cannot be eluted.

It is to be understood that only preferred embodiments of the invention have been described, and that numerous substitutions, alterations and modifications are all permissible without departing from the spirit and scope of the invention as defined in the following claims.

What is claimed is:

1. A method of synthesizing a resin comprising the steps of:
   absorbing a phenol as a counterion along the cationic sites within a plurality of cells of a three-dimensional cage network of a permeable, strong base, cross-linked, anion exchange resin matrix in the hydroxyl form;

adding formaldehyde to the absorbed phenol; and polymerizing the absorbed phenol in situ within the resin matrix by heating the material to polymerization temperature to form a linear phenol-formaldehyde resin extending through a plurality of cells of said resin matrix.

2. A method according to claim 1 in which the resin matrix comprises a three-dimensional cage network of a quaternary ammonium substituted resin.

3. A method according to claim 2 in which the resin matrix comprises a styrene-divinylbenzene copolymer containing less than 5 percent by weight of divinyl benzene and having an ion exchange capacity between about 3–6 meq/dry gram.

4. A method according to claim 2 in which the phenol is of the formula:

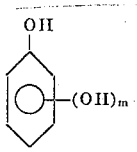

where $m$ is an integer from 0 – 2.

5. A method according to claim 4 in which the phenol is selected from hydroquinone, pyrogallol, catechol, resorcinol, phlorglucinol or phenol.

6. A method according to claim 2 in which the resin matrix is converted to a hydroxyl form before adding the phenol.

7. A method according to claim 1 in which the phenol is added in an amount equivalent to the ion exchange capacity of the resin.

8. A method according to claim 7 in which formaldehyde is added in an amount equivalent to the phenol.

9. A method according to claim 2 in which the material is heated to a temperature between 50° to 150°C during polymerization.

10. A method according to claim 4 in which the phenol is absent ortho-hydroxy functionality and further including the step of placing the resin matrix containing polymerized phenol in an aqueous solution containing excess formaldehyde for a period sufficient to introduce hydroxy-methyl groups onto the ortho position of said phenol molecules.

11. A resin composition of matter comprising in combination:

a permeable, cross-linked, strong-base resin matrix containing cationic groups and having a three-dimensional cage network including a plurality of cells, and a linear phenol-formaldehyde resin occluded within the matrix and extending through a plurality of cells thereof.

12. A resin according to claim 11 in which the resin matrix comprises a three-dimensional cage network of a quaternary ammonium substituted resin including backbone chains joined by cross-linking groups forming said cage network.

13. A resin according to claim 12 in which the resin matrix comprises a styrene-divinylbenzene copolymer containing less than 5% by weight of divinyl benzene and having an ion exchange capacity between about 3–6 meq/dry gram.

14. A resin according to claim 12 in which the phenol forming said polymer is selected from hydroquinone, pyrogallol, catechol, resorcinol, phlorglucinol or phenol.

15. A resin according to claim 12 in which the phenol contains a hydroxy-methyl group in ortho position.

16. A method of removing a molecular species from a quantity of liquid comprising the steps of passing said liquid through a stationary body of the resin as defined in claim 11.

17. A method according to claim 16 in which the species is oxygen and the phenol contains 1,2- or 1,4-dihydroxy functionality.

18. A method according to claim 16 in which the species is borate and the phenol contains 1,2-dihydroxy or 1-hydroxy, 2-hydroxymethyl functionality.

* * * * *